US010171491B2

(12) United States Patent
Del Fante

(10) Patent No.: US 10,171,491 B2
(45) Date of Patent: Jan. 1, 2019

(54) NEAR REAL-TIME DETECTION OF DENIAL-OF-SERVICE ATTACKS

(71) Applicant: Fortinet, Inc., Sunnyvale, CA (US)

(72) Inventor: Paul Del Fante, North Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 14/564,983

(22) Filed: Dec. 9, 2014

(65) Prior Publication Data

US 2016/0164912 A1 Jun. 9, 2016

(51) Int. Cl.
*H04L 29/06* (2006.01)
*H04L 29/08* (2006.01)

(52) U.S. Cl.
CPC ...... *H04L 63/1458* (2013.01); *H04L 63/1416* (2013.01); *H04L 67/02* (2013.01); *H04L 69/04* (2013.01)

(58) Field of Classification Search
CPC ............ H04L 63/1416; H04L 63/1425; H04L 63/145; H04L 63/1441; G06F 21/566
USPC .......................................................... 726/23
See application file for complete search history.

(56) References Cited

U.S. PATENT DOCUMENTS

| | | | | |
|---|---|---|---|---|
| 2011/0213869 | A1* | 9/2011 | Korsunsky | G06F 21/55 709/223 |
| 2011/0231510 | A1* | 9/2011 | Korsunsky | G06F 21/55 709/213 |
| 2011/0231564 | A1* | 9/2011 | Korsunsky | G06F 21/55 709/231 |
| 2011/0238855 | A1* | 9/2011 | Korsunsky | G06F 21/55 709/231 |
| 2014/0298461 | A1* | 10/2014 | Hohndel | H04L 63/1416 726/23 |

OTHER PUBLICATIONS

Wagner, et al. "Entropy Based Worm and Anomaly Detection in Fast IP Networks." Communication Systems Laboratory, Swiss Federal Institute of Technology Zurich. 6 pages.

(Continued)

*Primary Examiner* — William S Powers
(74) *Attorney, Agent, or Firm* — Hamilton, DeSanctis & Cha LLP

(57) ABSTRACT

Methods and systems for detection and mitigation of denial-of-service (DoS) attacks against network applications/services/devices in near real-time are provided. According to one embodiment, multiple access requests are received at a network device from a source Internet Protocol (IP) address. Temporal and/or spacial information relating to the access requests are stored in a first database operatively coupled with the network device. It is determined based on a first defined condition whether compression is to be performed on the stored temporal and/or spacial information. When a result of the determining is affirmative, then the stored temporal and/or spacial information is compressed. One or more compression ratios of the compressed temporal and/or spacial information with respect to the stored temporal and/or spacial information in uncompressed form are computed. The source IP address is identified as malicious based on the one or more compression ratios.

22 Claims, 11 Drawing Sheets

(56) References Cited

OTHER PUBLICATIONS

Dos Attack. AskF5. "About configuring the Big-IP system to detect SIP DoS attacks." https://support.f5.com/kb/en-us/products/big-ip_asm/manuals/product/dns-dos-firewall-implementations-11-4-0/4.print.html. 2 pages.
Junos Software Security Configuration Guide. "Configuring SIP Denial of Service (DoS) Attack Protection." http://www.juniper.net/techpubs/software/junos-security/junos-security10.0/junos-security-swconfig-security/id-77629.html. 2 pages.
IEEE Xplore Abstract. "An Anomaly Detection Algorithm Based on Lossless Compression." http://ieeexplore.ieee.org/xpl/login.jsp?tp=&arnumber=6310873&url=h...explore.ieee.org%2Fxpls%2Fabs_all.jsp%3Ftp%3D%26arnumber%3D6310873. 2 pages.
Inside the swarm. "How the deadly combination of SQL injections and botnets is fuelling an industrial revolution in cybercrime." http://www.information-age.com/technology/security/1094802/inside-the-swarm#. 8 pages.

\* cited by examiner

600

| Request Identifier | Spatial Bucket for Source IP 192.168.3.28 | |
|---|---|---|
| | Destination IP | Request Type |
| Req_192658 | 172.168.20.5 | SIP |
| Req_192659 | 172.168.20.10 | HTTP |
| Req_192660 | 172.168.10.5 | SMTP |
| Req_192661 | 172.168.10.2 | DNS |
| Req_192662 | 172.168.5.8 | HTTP |
| Req_192663 | 172.168.20.10 | SMTP |
| Req_192664 | 172.168.20.5 | SIP |
| Req_192665 | 172.168.20.10 | DNS |
| Req_192666 | 172.168.5.8 | HTTP |
| Req_192667 | 172.168.10.2 | SIP |
| Req_192668 | 172.168.10.5 | SMTP |
| Req_192669 | 172.168.20.10 | SIP |
| Req_192670 | 172.168.20.5 | HTTP |
| Req_192672 | 172.168.5.8 | DNS |
| Req_192674 | 172.168.10.2 | SMTP |
| Req_192675 | 172.168.20.5 | SIP |
| Req_192676 | 172.168.20.10 | DNS |
| Req_192677 | 172.168.10.5 | HTTP |
| Req_192678 | 172.168.10.2 | SMTP |
| Req_192679 | 172.168.5.8 | SIP |
| Req_192680 | 172.168.20.10 | DNS |
| Req_192681 | 172.168.20.5 | SMTP |
| Req_192682 | 172.168.20.10 | HTTP |
| Req_192683 | 172.168.5.8 | SIP |
| Req_192685 | 172.168.20.5 | DNS |
| Req_192686 | 172.168.20.5 | HTTP |
| Req_192687 | 172.168.5.8 | SMTP |
| Req_192688 | 172.168.10.5 | SIP |
| Req_192689 | 172.168.10.2 | DNS |
| Req_192690 | 172.168.20.5 | SIP |
| Req_192692 | 172.168.20.10 | SMTP |
| Req_192693 | 172.168.20.5 | SIP |
| Req_192694 | 172.168.10.2 | DNS |
| Req_192695 | 172.168.5.8 | SIP |
| Req_192696 | 172.168.20.5 | HTTP |
| Req_192697 | 172.168.20.5 | SMTP |

FIG. 6

NEAR REAL-TIME DETECTION OF DENIAL-OF-SERVICE ATTACKS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present disclosure generally relate to detection and mitigation of Distributed Denial-of-Service (DDoS) attacks. More particularly, embodiments of the present disclosure relate to systems and methods for efficiently detecting and mitigating zero-day DDoS attacks against network applications in near real-time.

Description of the Related Art

One of the major threats of the Internet today is Denial-of-Service (DoS) attacks and, in particular, distributed Denial-of-Service (DDoS) attacks. A DoS attack is typically an attack made in order to render a computer system/machine or a network resource unavailable to a legitimate user, thereby intending to cause loss of service or network connectivity to legitimate users. Although the means to carry out, motives for, and targets of a DoS attack may vary, it generally consists of efforts to temporarily or indefinitely interrupt or suspend services of a host connected to the Internet. Most common DoS attacks aim at exhausting computational resources, such as connection bandwidth, memory space, or CPU time, for example, by flooding a target network node/resource with valid or invalid requests and/or messages. They can also cause disruption of network components or disruption of configuration information, such as routing information, or can aim at disabling an application making it unusable. In particular, network components, such as servers, proxies, gateways, routers, switches, hubs, etc., may be disrupted by malicious software attacks, for example, by exploiting buffer overflows or vulnerabilities of the underlying operating system or firmware.

DDoS attacks involve two or more people/bots. A DDoS attack is basically a DoS attack that, instead of using a single computer as a base of attack, uses multiple compromised computers simultaneously, possibly a large or a very large number of them (e.g., millions), thus amplifying the effect. Altogether, they flood the network with an overwhelming number of packets, which exhaust the network or application resources. In particular, the packets may be targeting one particular network node, for example a router, a switch, a gateway, or application servers, causing it to crash, reboot, or exhaust its computational resources. The compromised computers, which are also often called as zombies, are typically infected by malicious software (e.g., a worm, a virus, or a trojan) in a preliminary stage of the attack, which involves scanning a large number of computers and searching for those having one or more particular vulnerabilities. The DDoS attack itself is then launched at a later time, either automatically or by a direct action of the attacker.

Various DoS attacks such as buffer overflow can cause server-running software to get confused and fill the disk space or consume all available memory or CPU time. Other kinds of DoS attacks rely primarily on brute force, flooding the target with an overwhelming flux of packets, over saturating its connection bandwidth or depleting the target's system resources. Bandwidth-saturating floods rely on the attacker having higher bandwidth available than the victim. A common way of achieving this today is via a DDoS attack employing a botnet. Other floods may use specific packet types or connection requests to saturate finite resources by, for example, occupying the maximum number of open connections or filling the victim's disk space with logs.

As described above, these DDoS attacks have become a favorite tool of hackers for targeting a web service or a network resource. By bombarding a server with traffic, they can make it impossible for legitimate users to secure a connection—effectively taking a site offline.

Traditionally, DDoS attacks are carried out at the network layer such as through Internet Control Message Protocol (ICMP) flooding, Transmission Control Protocol (TCP) SYN flooding, and/or User Datagram Protocol (UDP) flooding. The intent of these attacks is to consume the network bandwidth and deny service to legitimate users of the targeted systems. Since many studies have noticed this type of attack and have proposed different schemes (e.g., network activity measurement and/or anomaly detection) to protect the network and equipment from bandwidth attacks, it is not as easy as in the past for attackers to launch the DDoS attacks based on network layer. When the network layer DDoS attacks fail, attackers shift their offensive strategies to a more sophisticated application layer DDoS attacks.

In recent times, attackers have been targeting application layer services, such as Session Initiation Protocol (SIP), Hypertext Transport Protocol (HTTP), Simple Mail Transport Protocol (SMTP), Domain Name System (DNS) and the like, with DDoS attacks, which are now also being applied to voice communications, as hackers have started to harness massive Voice over Internet Protocol (VoIP) networks to flood phone networks and prevent genuine emergency calls from getting through. In another instance, attackers run a massive number of queries through the victim's search engine or database query to bring the target server down. The application level DDoS attacks may focus on exhausting server resources, such as sockets, CPU, memory, disk/database bandwidth, and I/O bandwidth. The growing frequency of these attacks has highlighted security issues with VoIP services, as hackers can quickly generate new numbers faster than traditional firewalls can block them, while VoIP also offers criminals a measure of anonymity as they are often hard to trace.

In the prior art solutions, attempts have been made to detect DDoS attacks from three different layers, namely the IP layer, TCP layer, and the application layer. Attempts have been made to distinguish traffic from legitimate users from that of potential DDoS attacks. Various statistical analysis based solutions have been proposed for detecting and preventing DDoS attacks at the physical layer to application level services. Existing anomaly detection techniques can typically be classified into two categories: rule-based techniques, and statistic-based or statistical techniques. Rule-based techniques describe normal behavior in terms of certain static rules or certain logic and can essentially be stateless or stateful. In particular, such rules can be derived from protocol specifications. On the other hand, statistical anomaly detection techniques describe normal behavior in terms of probability distributions of certain variables, called statistics, depending on the chosen data features or parameters.

These methods, used to detect application level DDoS attacks, typically employ rate-limiting (e.g., don't let a client make more than 3 calls every X seconds) as the primary defense mechanism against DDoS attacks. However, existing DDoS protection measures lack the sophistication to deal with a scenario in which several legitimate users suddenly make requests for a particular service. For example, during a sports event, several legitimate users may use a web service to check the scores, but a typical rate-limiting defense mechanism may mistakenly prevent the legitimate users from accessing the service as it is not easy for current techniques to distinguish requests from legitimate users from malicious users or bots merely by statistical characteristics of the traffic. Therefore, state of the art statistical methods and rate limiting techniques can easily confuse a high volume of requests by legitimate users with a DDoS attack and mistakenly prevent legitimate users from assessing the service.

Other existing defense methods described in the prior art for protection against DDoS attacks are based on man-machine interaction, e.g., puzzles, passwords, and the CAPTCHAs. However, these schemes are not effective/popular for DDoS attack detection because they may annoy users and introduce additional service delays.

There is therefore need for systems and methods that are able to, with a high degree of confidence, and in near real-time, identify and block the bots while letting legitimate users continue with uninterrupted access to the network applications, during an application layer DDoS attack, such as an attack against a SIP server, a proxy server, an HTTP server, a DNS, or any other desired/appropriate application.

SUMMARY

Methods and systems of the present disclosure are described for detection and mitigation of denial-of-service (DoS) attacks against network applications/services/devices in near real-time. According to one embodiment, multiple access requests are received at a network device from a source Internet Protocol (IP) address. Temporal and/or spacial information relating to the access requests are stored in a first database operatively coupled with the network device. It is determined based on a first defined condition whether compression is to be performed on the stored temporal and/or spacial information. When a result of the determining is affirmative, then the stored temporal and/or spacial information is compressed. One or more compression ratios of the compressed temporal and/or spacial information with respect to the stored temporal and/or spacial information in uncompressed form are computed. The source IP address is identified as malicious based on the one or more compression ratios.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 6 illustrates an exemplary representation showing a spatial information bucket for a source IP address in accordance with an embodiment of the present disclosure.

DETAILED DESCRIPTION

Figure 1A:
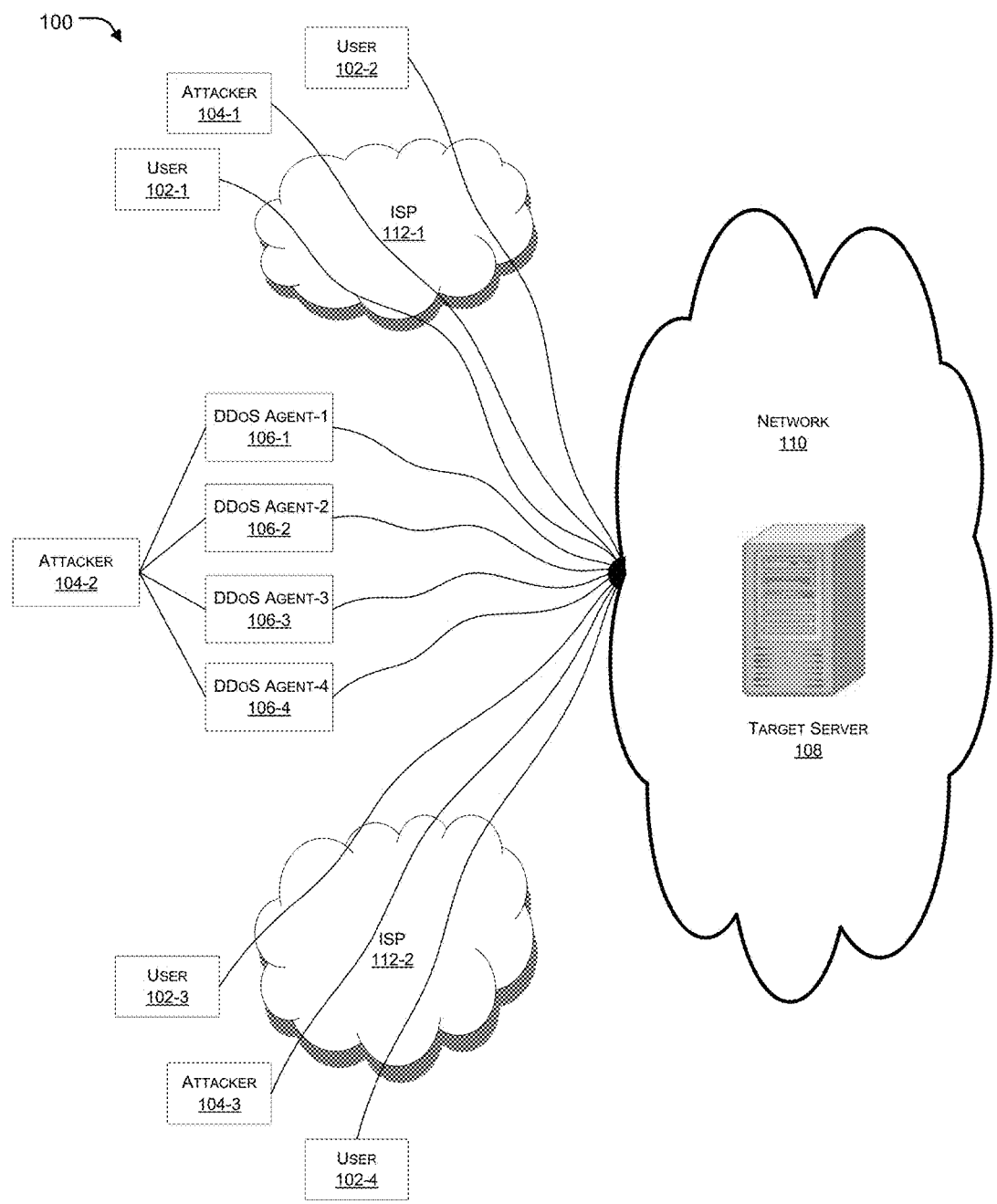
FIGS. 1A and 1B illustrate exemplary DDoS attack architectures in which aspects of the present disclosure can be implemented.

Methods and systems are described for detection and mitigation of denial-of-service (DoS) attacks in near real-time. In one embodiment, the DDoS detection and response processing can efficiently detect and mitigate DDoS attacks against network applications/services/devices in near real-time while allowing legitimate users to continue with uninterrupted access to the network applications/services/devices.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of conducting network auditing, it should be appreciated that the same has been done merely to illustrate the invention in an exemplary manner and any other purpose or function for which explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named According to one embodiment, DDoS attack detection and response processing includes receiving, at a network device, multiple access requests from a source Internet Protocol (IP) address and storing, in a first database that is operatively coupled with the network device, temporal information relating to the plurality of access requests from the source IP address. The process further includes the step of determining, by means of the network device, based on a first defined condition, whether compression is to be performed on the stored temporal information, wherein when the result of such determination is affirmative; the stored temporal information can be compressed. The process can further include the step of computing, by the network device, a compression ratio of the compressed temporal information with respect to the stored temporal information in uncompressed form, wherein the network device can identify the source IP address as malicious when the compression ratio is greater than a defined baseline value.

According to another embodiment, DDoS attack detection and response processing can further include storing, in a second database that is operatively coupled with the network device, spatial information relating to the access requests from the source IP address, and determining, by means of the network device, based on a second defined condition, as to whether compression is to be performed on the stored spatial information such that when the result of such determination based on a second defined condition is affirmative, the stored spatial information can be compressed and a second compression ratio of the compressed spatial information with respect to the stored spatial information in uncompressed form can be computed such that the network device identifies the source IP address as malicious when the second compression ratio is greater than a second defined baseline value.

Those skilled in the art will appreciate that even though various embodiments may be described with reference to first computing temporal compression followed by spatial compression, the same is exemplary in nature and changing the ordering is completely within the scope of the present disclosure.

According to one embodiment, compression of stored spatial/temporal information can be conducted using a lossless compression means. According to another embodiment, the access requests can include requests associated with a protocol including one or more of Session Initiation Protocol (SIP), Hypertext Transport Protocol (HTTP), HTTP Secure (HTTPS), Simple Mail Transfer Protocol (SMTP), Real-time Transport Protocol (RTP), RPT Control Protocol (RTCP), Session Description Protocol (SDP) and Domain Name System (DNS) protocol.

According to another embodiment, the first defined condition may relate to whether a sufficiently large sample of data is available for analysis. For example, the first defined condition may be based on one or a combination of whether the first database has reached a pre-defined size or whether a defined time interval has elapsed since storage of the temporal information commenced. Similarly, the second defined condition can be based on one or a combination of whether the second database has reached a pre-defined size or whether a defined time interval has elapsed since storage of the temporal information commenced.

According to yet another embodiment, the temporal information can include information regarding one or a combination of a time since a last request was received by or initiated by the source IP address, and a time associated with each request from the source IP address. The spatial information can include one or a combination of details regarding the source IP address, details regarding resources requested by the plurality of access requests, and details regarding the plurality of access requests.

The method of the present disclosure can further continue to store the temporal information in the first database when the result of determination of whether compression is to be performed is negative. Similarly, the method of the present disclosure can further continue to store the spatial information in the second database when the result of determination of whether compression is to be performed is negative.

In yet another embodiment, the first and second defined baseline values can be determined based on statistical analysis of one or a combination of a reference compression ratio, learning engine defined compression ratio, and computed information entropy.

According to one embodiment, a DDoS attack detection and response system includes a data receiving module configured to receive multiple access requests from a source Internet Protocol (IP) address, and a temporal data storage module configured to store temporal information relating to the access requests in a first database. The system can further include a spatial data storage module configured to store spatial information relating to the plurality of access requests in a second database operatively coupled with the network device, and a compression module configured to compress the stored temporal information and compute a first compression ratio of the compressed temporal information with respect to the stored temporal information in uncompressed form, wherein the compression module can further be configured to compress the stored spatial information and compute a second compression ratio of the compressed spatial information with respect to the stored spatial information in uncompressed form. In an aspect, the system of the present disclosure can further include a compression ratio based decision module configured to declare the source IP address as malicious based on comparison of first compression ratio with a first defined baseline value, and comparison of second compression ratio with a second defined baseline value.

Figure 1B:
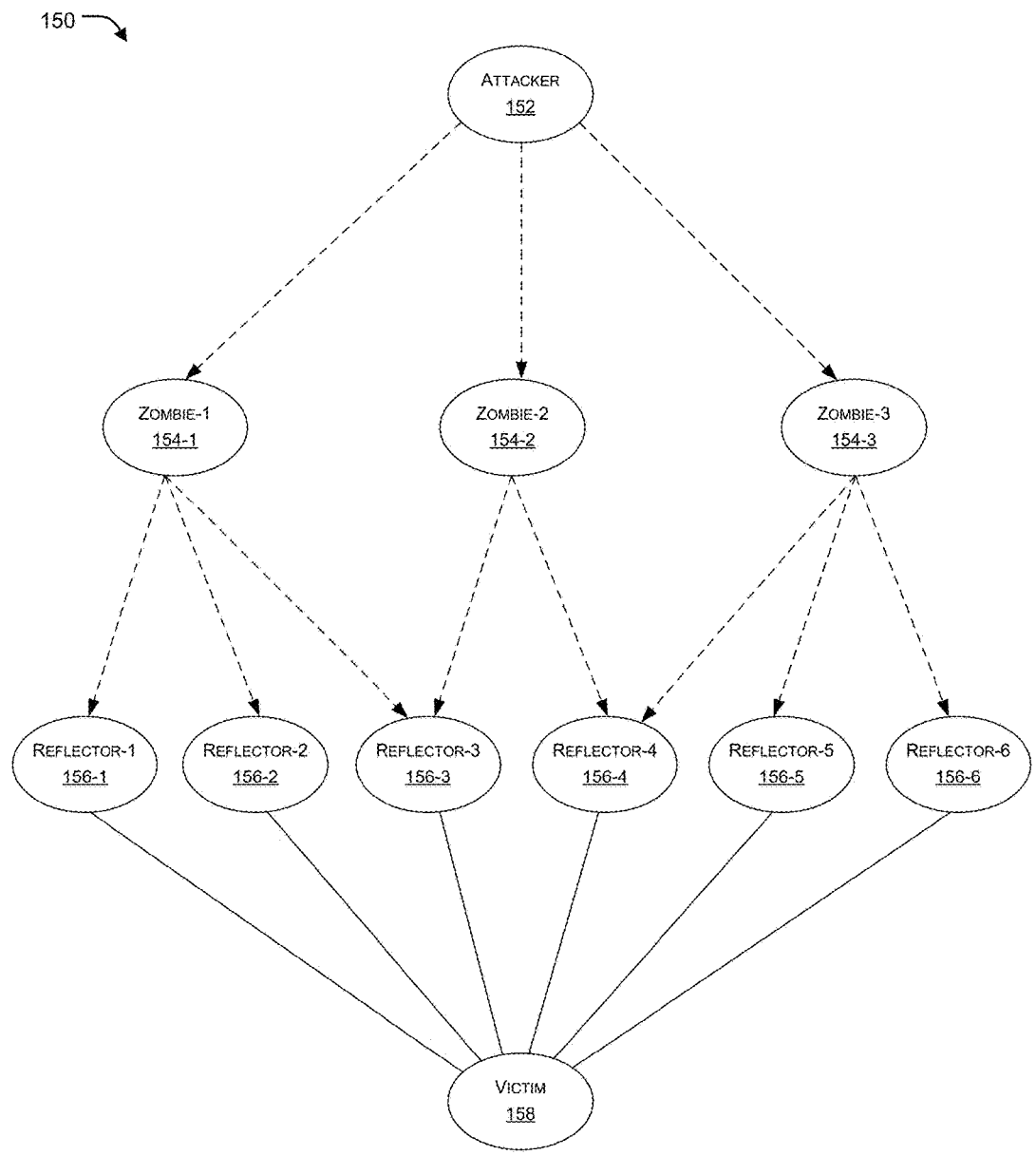

FIGS. 1A and 1B illustrate exemplary DDoS attack architectures 100 and 150 in which aspects of the present disclosure can be implemented. FIG. 1A illustrates an exemplary DDoS attack on a network 100 having a target server 108. As illustrated, legitimate users, such as 102-1 and 102-2 (which may be collectively referred to as user(s) 102 hereinafter), can, along with an attacker 104-1, send one or more network resource access requests to the target server 108 through an Internet Service Provider (ISP) such as ISP 112-1. Alternatively, independently or in combination, another attacker 104-2 can, through multiple DDoS agents, such as DDoS Agent-1 106-1, DDoS Agent-2 106-2, DDoS Agent-3 106-3, and DDoS Agent-4 106-4 (which may be collectively referred to as DDoS Agents 106 hereinafter), send one or more network/resource access requests to the target server 108.

Similarly, as shown in FIG. 1A, legitimate users 102-3 and 102-4 along with an attacker 104-3 can, through ISP 112-2, make access requests to the target server 108. Those skilled in the art will appreciate that this configuration/construction is exemplary in nature and therefore is not intended to be limiting on embodiments of the present invention.

Any number of legitimate users 102 can, at a given time, try access a given network resource, e.g., a webpage, a file/document or an application (that may be stored or provided by the target server 108), wherein the users 102 can be located at different geographic locations and may attempt resource accesses across different time intervals, thereby rendering a situation wherein the requests are temporally and/or spatially spread out. Similarly, attackers 104 can, directly and/or through DDoS agents 106, send several connection/service requests to the target server 108, where these requests generally demonstrate/include a temporal/spatial pattern (and are therefore less random than requests made by legitimate users) as they are typically generated through malicious code using a some predefined algorithm. One mandate of such attackers 104 is to send as many requests as possible to the target server 108 so as to exhaust resources of the target server 108. DDoS Agents 106 are typically used by attackers 104 to mask/conceal their identity, wherein such agents 106 can include any computing device such as personal computer (PC), laptop, mobile phone, smart phone, among any other device capable of sending network packets to a desired location/device/server.

A DDoS agent 106 may be an infected user or can include a zombie agent and/or reflector(s) agent, wherein requests made by attackers 104 and/or DDoS agents 106 can be stored in terms of the temporal and/or spatial information in one or a combination of databases, such that, at desired time intervals, the stored temporal/spatial information can be compressed to determine the compression ratio(s) to allow a decision to be made as to whether the incoming set of network access requests are malicious or are from legitimate user(s). In aspects of the present disclosure therefore, network behavior and/or randomness of requests received from each user 102 and/or attacker 104 can be analyzed, and based on the amount of randomness in requests received from the user 102 and/or the attacker 104, a DDoS attack can be identified and mitigated in near real-time. As DoS attacks follow a defined pattern with respect of their temporal and/or spatial information, the compression ratio is much higher for data/network packets issued by an attacker. Temporal information can include, but is not limited to, information regarding the time since a last request was received by or initiated by a particular source IP address, an average time between subsequent requests, a maximum time between subsequent requests, a minimum time between subsequent requests, and a time associated with each request from the particular source IP address, among other temporal attributes. Non-limiting examples of spatial information, on the other hand, include details regarding the particular source IP address, resources requested by the access requests, a geographic location from which the requests are being issued, a protocol type of each incoming request, among other spatial attributes regarding the access requests.

FIG. 1B illustrates another exemplary architecture 150 used by attackers showing several zombies 154 and reflectors 156 that can be detected and mitigated in near real-time by systems and methods of the present disclosure. FIG. 1B shows an attacker 152 that can, through the use of multiple zombies such as 154-1, 154-2, and 154-3, which may be collectively referred to as zombie(s) 154, implement/initiate a DDoS attack on a victim 158. Each zombie 154 can use multiple reflectors such as 156-1, 156-2, 156-3, 156-4, 156-5, and 156-6, which may be collectively referred to as reflector 156 hereinafter. Multiple zombies 154 may use a common reflector 156 in order to direct their traffic towards victim 158 in an attempt to swamp resources (e.g., VoIP servers, email servers, web servers, application servers, etc.) of victim 158, thereby denying services to legitimate users. Zombie 154 and/or reflector 156 may be unwilling hosts or infected/compromised users that forward connection/service requests created by malicious viruses/trojans toward victim 158.

Figure 2:
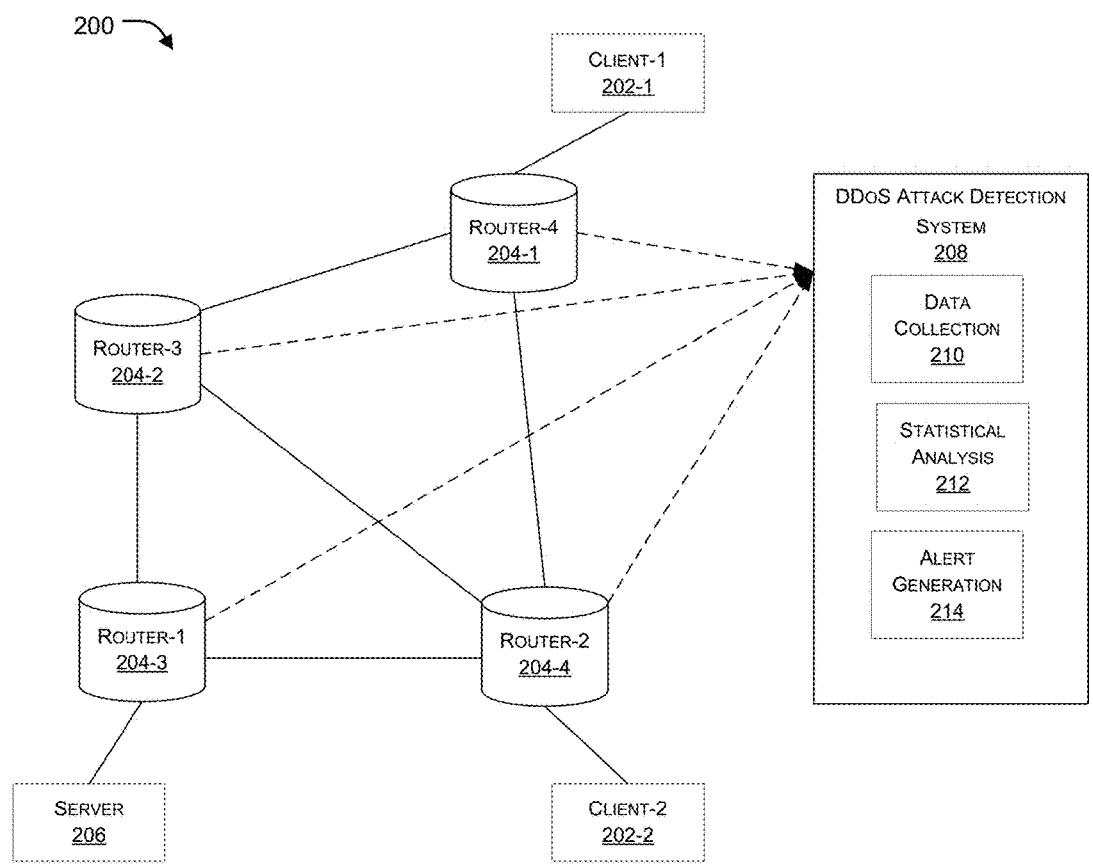
FIG. 2 illustrates an exemplary network architecture having a DDoS detection and response system in accordance with an embodiment of the present disclosure.

FIG. 2 illustrates an exemplary network architecture 200 having a DDoS attack detection system 208 in accordance with an embodiment of the present disclosure. The exemplary architecture 200 illustrates traffic between clients such as client 202-1 and 202-2, which may be collectively referred as clients 202 hereinafter, and server 206 through multiple network routers such as 204-1, 204-2, 204-3, and 204-4, which may be collectively referred to as router(s) 204. In an aspect, clients 202 can include both legitimate and/or malicious users/attackers configured to send multiple network resource access requests to server 206. In one embodiment, information regarding the requests can be received and collected in one or a combination of databases of a data collection module 210 of DDoS attack detection system 208. In an exemplary embodiment, DDoS attack detection system 208 can be integrated within a network device (e.g., a router, a gateway, a hub, a switch, a firewall, an access point, among other applicable devices) or the functionality may be integrated within server 206.

The traffic flowing through routers 204 may include both genuine traffic/communication requests and illegitimate communication requests intending to swamp the server's resources. In one embodiment, DDoS attack detection system 208 can be configured to collect, in one or more databases (that either form part of DDoS attack detection system 208 or are operatively coupled thereto) temporal and/or spatial information relating to one or more incoming requests from the various observed source IP addresses through data collection module 210, and implement statistical analysis on the stored temporal and/or spatial information through a statistical analysis module 212 so as to determine, through an alert generation module 214, whether the incoming requests from a given source IP is malicious or legitimate.

In an implementation, statistical analysis module 212 may compress stored temporal and/or spatial information received from one or a combination of source IP addresses to generated compressed temporal and/or spatial information, and then compute a first compression ratio based on compressed temporal information with respect to uncompressed temporal information, and a second compression ratio based on compressed spatial information with respect to uncompressed spatial information. DDoS attack detection system 208 can further be configured to compare the first and second compression ratios with respective threshold/baseline values to determine whether the network resource access requests are malicious in nature. As temporal and/or spatial patterns of incoming network resource access requests from malicious users tend to be more concentrated, compression ratios of such access requests are higher. For instance, 100% of stored temporal information might be represented through say 20% of the incoming data packets, and therefore if the minimum threshold/baseline for temporal compression ratio is 75%, the user responsible for the stored temporal data is declared as being malicious if the compression ratio is 75% or above. According to one embodiment, even if an attacker tries to vary the time of attack randomly, the compression ratio of spatial information can be used to determine whether the user is malicious or not. Therefore, in an aspect, both spatial as well as temporal information can be used for determination of user status, whereas, in another aspect, only spatial or only temporal information can be used for such determination.

In another aspect, baseline/threshold compression ratios can be determined automatically based on any or a combination of historical patterns of compression ratios, a learning engine that learns and continuously updates optimal compression ratios, desired information entropy, among other parameters. In yet another aspect, baseline/threshold compression ratios can be defined manually. In another aspect, multiple baseline/threshold compression ratios can be defined for temporal information, wherein such multiple baseline/threshold compression ratios can be defined based on any or a combination of the resource being accessed, the time of access, the duration of access, the frequency of access, the number of requests from different source IPs, among other like parameters.

According to one embodiment, alert generation module 214 can be configured to alert server 206 or a network level device, such as a firewall, access point (AP), gateway, or any other desired/configured device, so as to block the requests from a given source IP, that has been identified as being associated with an attack.

According to one embodiment, temporal information and spatial information can be stored in different databases, whereas, in another embodiment, the temporal information and the spatial information can be stored in a single database that is operatively coupled with DDoS attack detection system 208.

According to one embodiment, the statistical analysis can be configured to be performed responsive to a variety of different factors. For example, statistical analysis module 212 may periodically perform statistical analysis based on a defined and/or configurable time interval, responsive to a command from the administrator, responsive to observing a predefined or configurable number of incoming network resource access requests or responsive to fulfillment of other defined conditions, including, but not limited to the status of the database(s) storing the temporal/spatial information.

Figure 3:
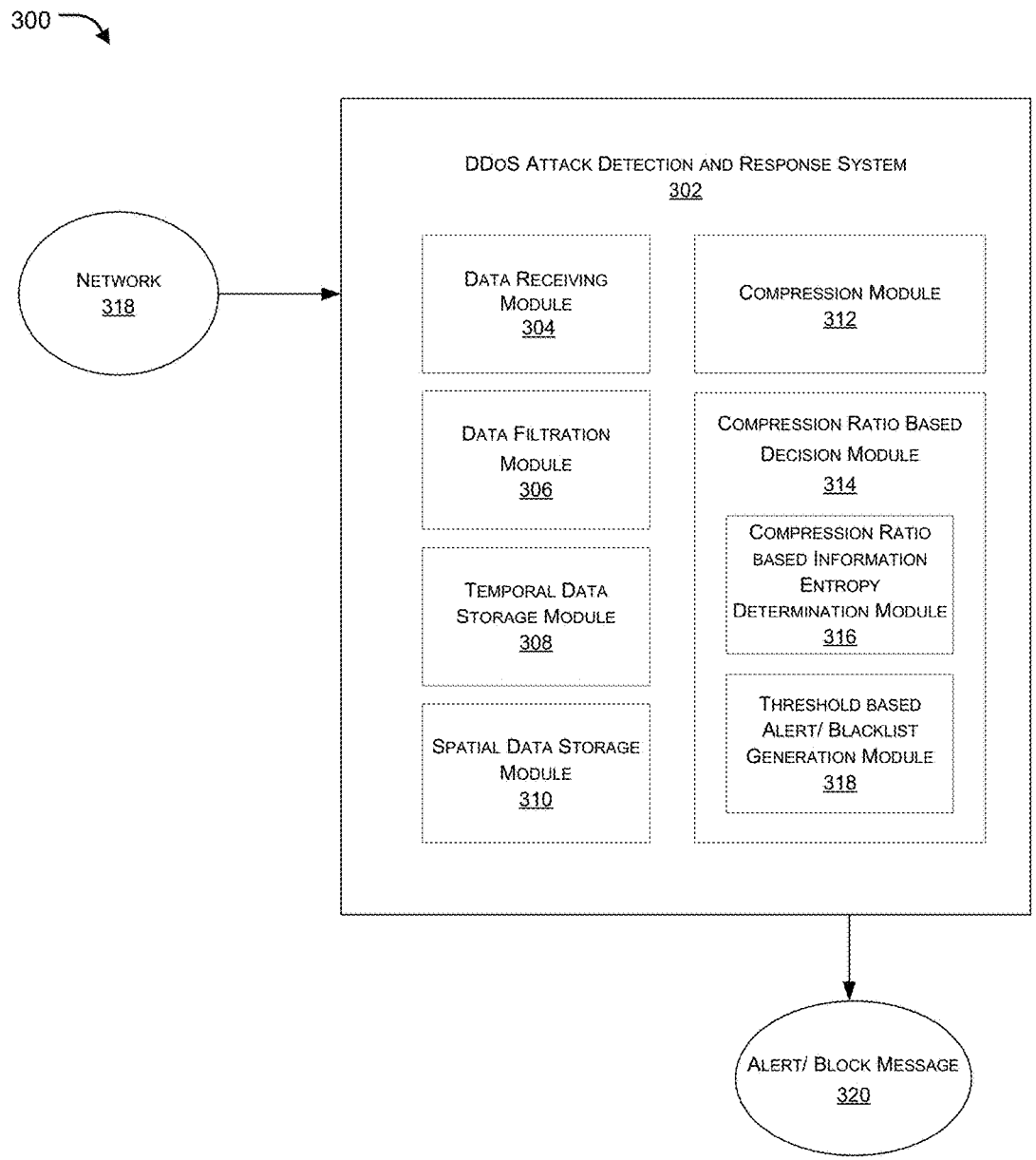
FIG. 3 illustrates an exemplary representation showing functional modules of a DoS attack detection and response system in accordance with an embodiment of the present disclosure.

FIG. 3 illustrates an exemplary representation 300 showing functional modules of a DDoS attack detection and response system 302 in accordance with an embodiment of the present disclosure. According to one embodiment, DDoS attack detection and response system 302 is operatively coupled with a network 318 and can be configured to receive one or more incoming network packets and process the incoming packets to identify whether the source of the packets relates to a legitimate user or to a malicious user.

According to one embodiment, DDoS attack detection and response system 302 includes a data receiving module 304, a data filtration module 306, a temporal data storage module 308, a spatial data storage module 310, a compression module 312, and a compression ratio based decision module 314, wherein compression ratio based decision module 314 can further include a compression ratio based information entropy determination module 316 and a threshold based alert/blacklist generation module 318. Those skilled in the art will appreciate that the functional modules described herein are exemplary in nature and that the functionality provided thereby can be distributed or consolidated in a variety of other ways.

According to one embodiment, data receiving module 304 can be configured to receive access requests from one or more source Internet Protocol (IP) addresses, wherein the access requests can be received from network 318 in the form of one or more network data packets. Data receiving module 304 can be customized in order to capture only a subset of the access requests. For example, only those access requests associated with suspicious IP addresses or certain sender attributes may be processed by DDoS attack detection and response system 302. In this manner, packets associated with known/registered legitimate users may not need to go through DDoS attack detection and response system 302. Therefore, instead of receiving all the data packets, only a selective set of network resource access requests can be received by the data receiving module 304 of DDoS attack detection and response system 302. In other embodiments, DDoS attack detection and response system 302 may process all observed access requests as even sources of traffic believed to be legitimate may have become compromised.

Data filtration module 306 can be configured to extract/determine temporal and/or spatial information from the received set of network resource access requests. In an aspect, the temporal information can include, but is not limited to, information regarding one or a combination of the time since a last request was received by or initiated by the source IP address, the frequency of access requests from the given source IP address, and the time associated with each request from the source IP address, among other timing-related attributes/parameters. Therefore, temporal information is indicative of "when" based attributes (e.g., the number of seconds between each VoIP call).

Spatial information, on the other hand, can include, but is not limited to, one or a combination of details regarding the source IP address, resources requested by the access requests, the type of protocol associated with each request, geographic locations from which the network access requests are originating, location-based frequency of requests, details regarding the access requests, among other spatial parameters/attributes. Spatial information can therefore, in the example of a VoIP call, indicate whom the source user was calling, what resources are being requested, among other spatial attributes. Data filtration module 306 can further be configured to filter out undesired temporal and/or spatial information based on one or more network traffic flow based conditions/criteria that can be system-defined or can be user/administrator defined.

According to one embodiment, temporal data storage module 308 can be configured to store the temporal information relating to the access requests in a first database. Such a database can either be a part of DDoS attack detection and response system 302 or can be operatively coupled thereto. Similarly, spatial data storage module 310 can be configured to store the spatial information relating to the access requests in a second database, wherein the second database can either be a part of DDoS attack detection and response system 302 or can be operatively coupled thereto. In one embodiment, the first and the second databases may be one in the same and therefore both the temporal as well as the spatial information may be stored together.

According to one embodiment, compression module 312 can be configured to, at defined time intervals, retrieve temporal information from the first database and compress the same to obtain compressed temporal information, and then compute a compression ratio of the compressed temporal information with respect to the stored temporal information in uncompressed form. Compression module 312 can further be configured to compress stored spatial information and compute a second compression ratio of the compressed spatial information with respect to the stored spatial information in uncompressed form. According to one embodiment, compression of the temporal and/or the spatial information can be performed through a lossless compression algorithm, including, but not limited to, run-length encoding, Lempel-Ziv 1978, DEFLATE, bzip2, Lempel Ziv-Markov chain algorithm, statistical Lempel Ziv, among other appropriate lossless compression algorithms. According to one embodiment, the time instances at which the temporal information is compressed can be different from the time instances at which the spatial information is compressed, whereas, in another embodiment, the time instances can also be same such that both the temporal as well as the spatial information are compressed at substantially the same time. According to another embodiment, the time intervals for performing the compression can be defined/configured/adjusted based on one or a combination of a variety of factors including, but not limited to, administrator input, status of one or both of the first and second databases, volume of access requests and the like. For instance, the temporal information can be compressed upon the earlier of (i) when the database in which it is stored is filled to a predefined or configurable threshold (e.g., 30% filled); (ii) when the number of database entries meets or exceeds an absolute threshold; or (iii) when processor/resource efficiency falls below a predefined or configurable threshold (e.g., 40%).

According to one embodiment, compression ratio based decision module 314 can be configured to declare the source IP address as malicious based on a comparison of the first compression ratio with a first defined baseline value and/or based on comparison of the second compression ratio with a second defined baseline value. For example, the compression ratio threshold can be set at 70% such that when the compression ratio of the temporal information is more than 70%, the user responsible for the stored temporal information is identified as being malicious/attacker, as for DDoS attacks, a high degree of temporal pattern can be observed, and therefore the information can be losslessly compressed more than the random time intervals used by legitimate users. Similarly, a threshold compression ratio for spatial information can be defined at being 80% or any other appropriate value. Such threshold/baseline compression ratio values can be defined based on statistical analysis of one or a combination of a reference compression ratio, a compression ratio defined by a learning engine and desired information entropy.

According to one embodiment, compression ratio based decision module 314 can include a compression ratio based information entropy determination module 316 and a threshold based alert/blacklist generation module 318, wherein compression ratio based information entropy determination module 316 can be configured to determine information entropy based on compression ratios of the temporal information and/or the spatial information, wherein the information entropy is indicative of the extent to which the temporal/spatial information is meaningful and legitimate. For instance, an attacker/bot/malicious user would have information entropy such that its behavioral distribution is more than a few standard deviations outside of the normal baseline. In other words, a bot or an attack tool, in almost all cases, behaves in a manner that generates considerably less information entropy (which produces a high compression ratio) as compared to legitimate users.

According to one embodiment, client streams that exhibit very unusual entropy scores, e.g., high compression ratios and/or outside 4 standard deviations, have a very low probability of being legitimate. Conversely, blocking such 4-sigma users during a network attack would have a high probability of mitigating the attack and a low probability of impacting legitimate users. In one embodiment, threshold based alert/blacklist generation module 318, based on the information entropy derived from the compression ratios of temporal/spatial information, is configured to generate one or more alerts 320 for such anomalous clients, and optionally temporarily blacklist the clients, e.g., when certain system or protocol attack thresholds are met.

In an exemplary implementation, for each user/source IP, sample data can be saved in two buckets, namely, a time bucket and a resource bucket, wherein, in the time bucket, the time interval between each subsequent request can be saved, and in the resource bucket, relevant resource identifiers can be saved, e.g., the SIP call destination, the HTTP URL, the DNS URI, etc. After a configurable period of time (a reasonable default might be 5 minutes or so), the data streams in each bucket can be compressed, and the compression ratio can be used as a score for the temporal and spatial entropy. The historical baseline can be consulted to determine the sigma number, i.e., how many standard deviations, how rare of an event it is, among other like statistical parameters. At one or more configurable sigma numbers, one or more configurable actions might be taken. For example, depending upon the particular implementation, an event may simply be logged at 3 sigmas and that same event may be blacklisted at 4 sigmas. According to one embodiment, DDoS attack detection and response system 302 can work either as a standalone feature dedicated to SIP DDoS protection for example, or can be integrated into a framework of a broader anti-DDoS feature set.

Figures 4A, 4B:
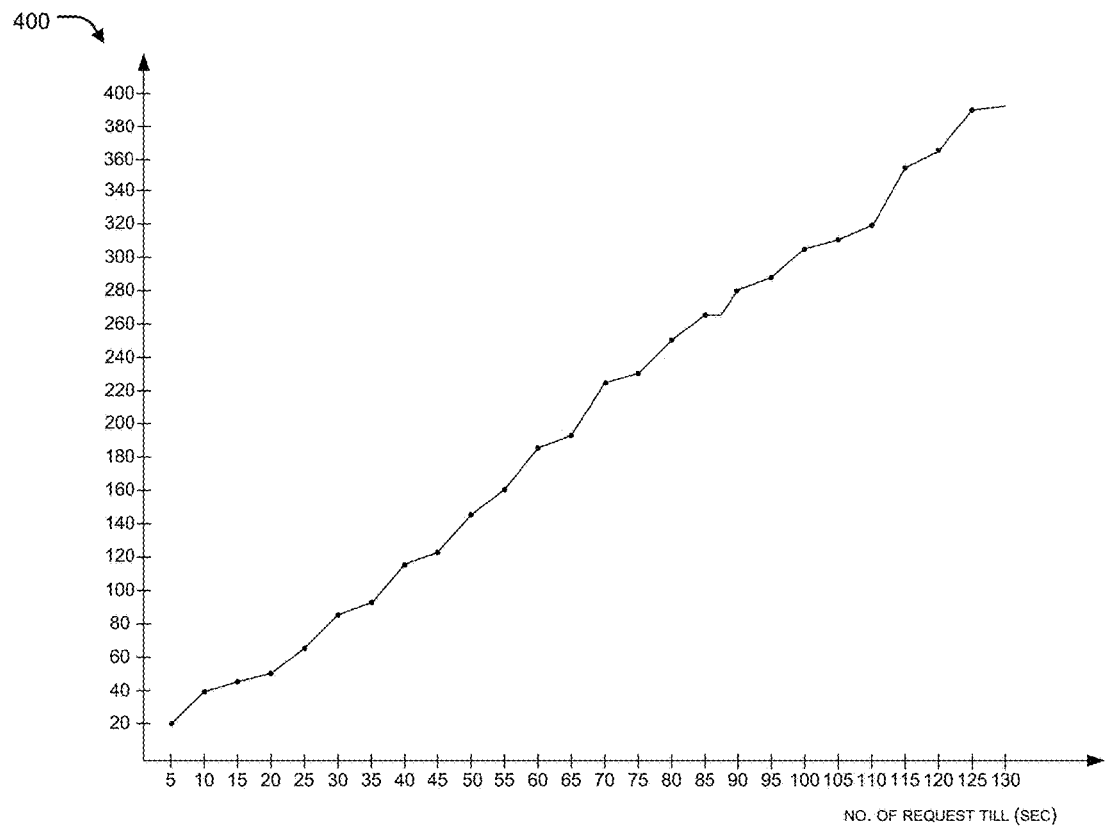
FIGS. 4A and 4B graphically illustrate volume of requests over time for an exemplary DDoS attack.

FIGS. 4A and 4B graphically illustrate a volume of requests over time for an exemplary DDoS attack. Graph 400 shows the number of requests received at a network device from a given source IP, wherein the number of requests can be represented along the Y-axis, and the time interval during which the request was received can be represented (in seconds) along the X-axis. As illustrated in graph 400, 20 requests were received between 0 to 5 seconds, 200 requests were received at the 60-seconds mark, 310 requests were received at the 120-second mark, and so on. It can also be seen that the number of requests are increasing by around the same percentage during each time interval duration, indicating temporal information stored by the proposed system would not have much randomness and therefore have a high compression ratio. The consistent and largely equal increasing number of requests per second or within a predefined time interval can be indicative of a DDoS attack, wherein the system of the present disclosure can, for defined time durations, store temporal information relating to incoming network resource access requests, and then compress the stored temporal information for each desired duration to compute compression ratio, which is indicative of information entropy. In accordance with the above, graph 450 shows the volume of requests across three time durations $D_{i-1}$, $D_i$, and $D_{i+1}$, wherein such volumes are computed across multiple time durations, say for every 5 second interval, to determine accurate temporal information relating to incoming network access requests.

Figure 5:
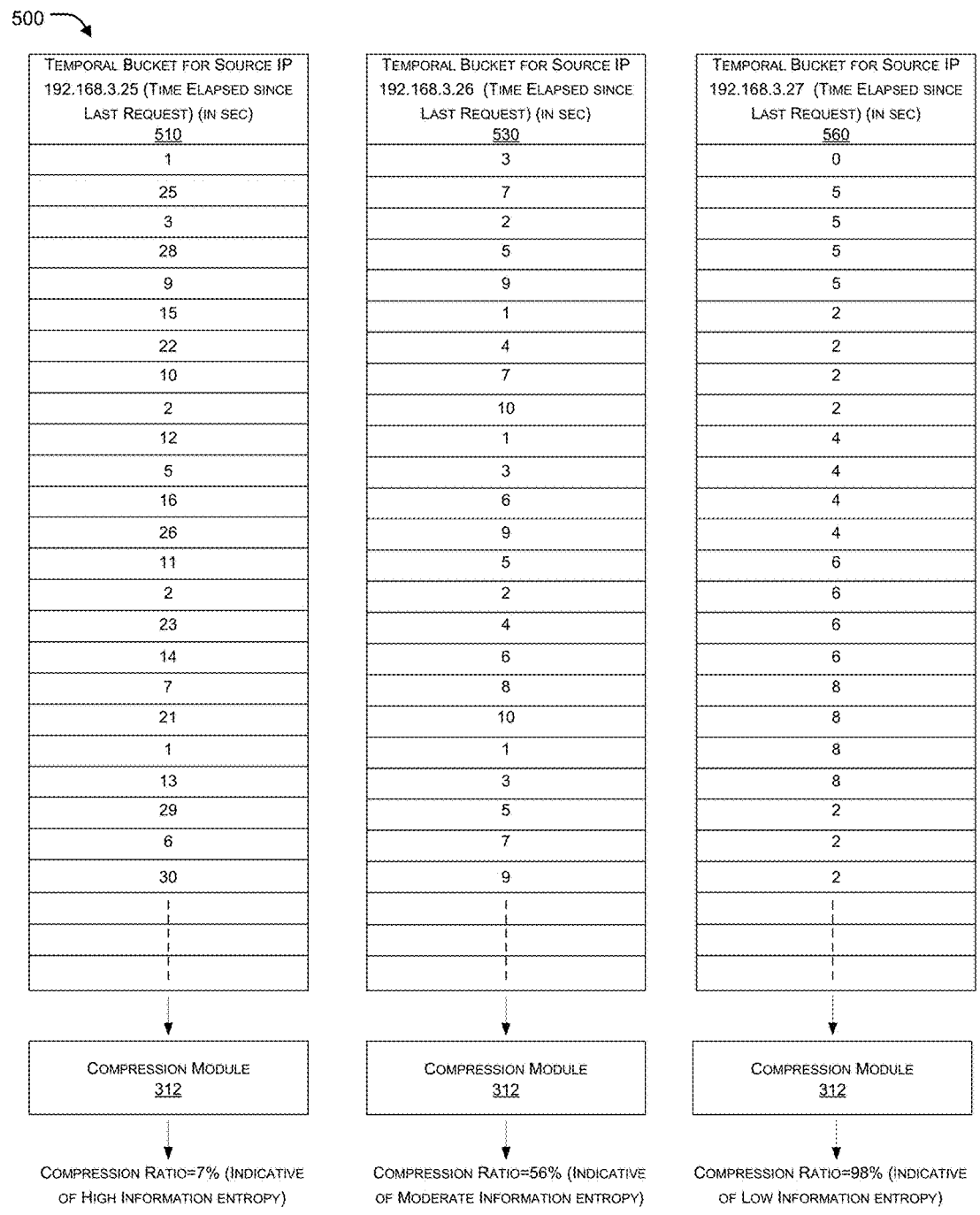
FIG. 5 illustrates an exemplary representation showing a temporal information bucket for a source IP address in accordance with an embodiment of the present disclosure.

FIG. 5 illustrates an exemplary representation 500 of temporal information for incoming network resource access requests from three different source IP addresses. One should appreciate that the representation is exemplary in nature, and the format/size/structure of how actual temporal information is stored in the context of various implementations may be completely different.

According to one embodiment, temporal information can be represented in terms of time elapsed since last request (in seconds), wherein, as can be seen from temporal bucket for source IP address 192.168.3.25, the time elapsed since last request is highly random ranging from 1 to 30 across varied intervals, and therefore, upon processing by compression module 312, the compression ratio obtained would be low (only 7%), indicating high information entropy. Similarly, for source IP address 192.168.3.26, the time elapsed since last request is moderately random ranging from 1 to 10 across varied intervals, and therefore, upon processing by the compression module 312, the compression ratio obtained is moderate (56%), indicating a relatively lower information entropy. With reference to source IP address 192.168.3.27, the time elapsed since last request has a strong pattern ranging from 1 to 8 across varied intervals, and therefore, upon processing by the compression module 312, the compression ratio obtained is very high (98%), indicating a very low information entropy and almost certainly identifying the source IP as malicious.

In one embodiment, the decision regarding whether to identify a particular source IP as malicious can be based on a defined/configurable threshold/baseline value. Referring back to the example temporal buckets of FIG. 5, if the malicious threshold is defined to be 50%, then the user with source IP 192.168.3.26 would be identified as a malicious user.

On similar pattern, each new IP address can be bucketed in terms of temporal information/attributes being present in network access requests/data packets being issued by the source IP. In another aspect, apart from time since last request, any other temporal parameter can also be stored/logged.

FIG. 6 illustrates an exemplary representation 600 showing a spatial information bucket for a source IP address in accordance with an embodiment of the present disclosure. Although any number of spatial attributes can be logged while storing spatial information relating to one or more network access requests, the present exemplary illustration 600 shows storage of a request identifier associated with each network access request along with a destination IP for which the data packets are intended and a type of network resource access request. For instance, for the source IP 192.168.3.28, the first request has an identifier Req_192658 having a destination IP of 172.168.20.5 and having a request type being SIP. Similarly, the second request has an identifier Req_192659 having a destination IP of 172.168.20.10 and having a request type being HTTP. Based on such stored spatial information relating to packets from the same source IP, compression can be performed to determine the compression ratio and compare the same with a spatial compression ratio threshold to identify whether the source IP is that of an attacker or of a legitimate user.

Figure 7:
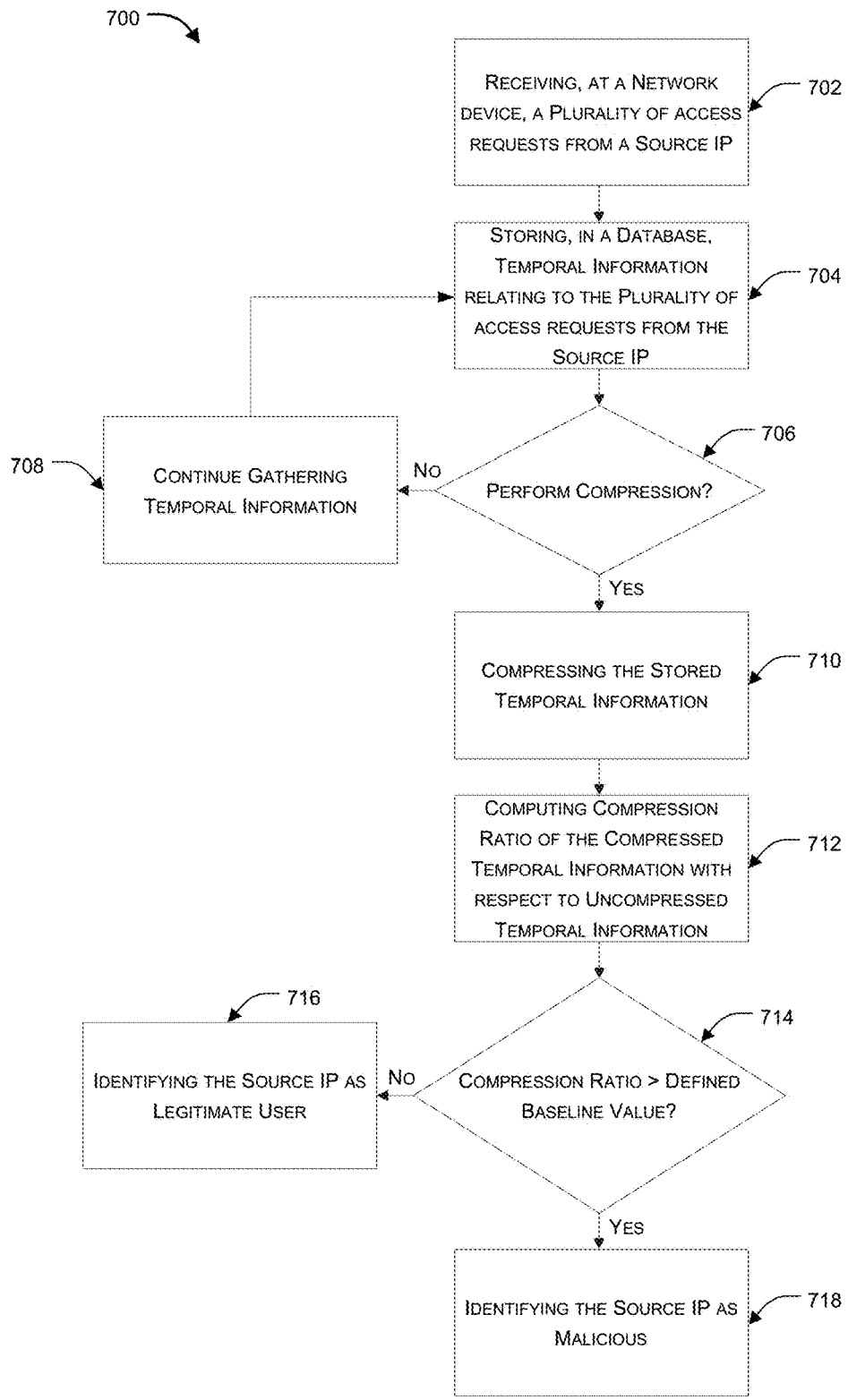
FIG. 7 is a flow diagram illustrating exemplary DDoS detection and response processing in accordance with an embodiment of the present disclosure.

FIG. 7 is a flow diagram illustrating exemplary DDoS detection and response processing in accordance with an embodiment of the present disclosure. In the context of the present example, DDoS attacks are detected and mitigated based on the temporal information associated with incoming network access requests. At block 702, a network device can receive multiple access requests originating from a given source IP, wherein, at block 704, the network device can process the access requests to store in a database, temporal information relating to the access requests.

At decision block 706, the network device determines whether to perform compression on the stored temporal information. According to one embodiment, when a compression triggering event has occurred, e.g., expiration of an interval timer, receipt of a command from the administrator, observation of access requests over a predefined/configurable time frame of a volume of access requests meeting or exceeding a threshold or one or more conditions relating to the temporal information database have been satisfied, then processing continues with block 710; otherwise processing branches to block 708, where more temporal information continues to be gathered and stored.

At block 710, the stored temporal information is compressed using a lossless compression technique.

At block 712, a compression ratio of the compressed temporal information with respect to the uncompressed temporal information is computed.

At decision block 714, it is determined whether the compression ratio is greater than the defined baseline/threshold value. If so, then processing continues with block 718; otherwise processing branches to block 716.

At block 718, the source IP is identified as being malicious.

At block 716, the source IP is identified as being legitimate.

Figure 8:
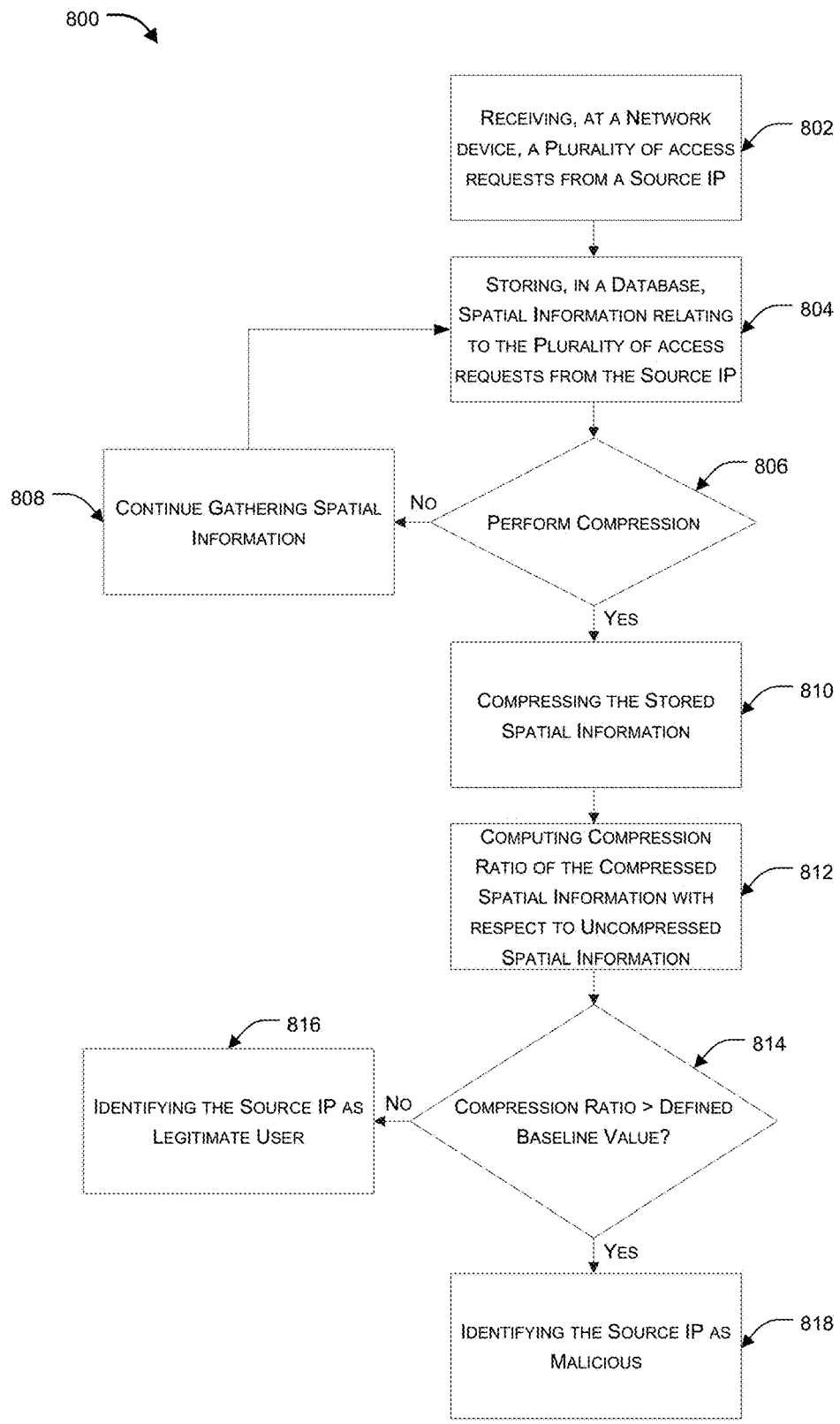
FIG. 8 is a flow diagram illustrating exemplary DDoS detection and response processing in accordance with another embodiment of the present disclosure.

FIG. 8 is a flow diagram illustrating exemplary DDoS detection and response processing in accordance with another embodiment of the present disclosure. In the context of the present example, DDoS attacks are detected and mitigated based on the spatial information associated with incoming network access requests. At block 802, a network device receives multiple access requests originating from a given source IP, wherein, at block 804, the network device processes the access requests to store in a database, spatial information relating to the access requests.

At block 806, the network device determines whether to perform compression on the stored spatial information. According to one embodiment, when a compression triggering event has occurred, e.g., expiration of an interval timer, receipt of a command from the administrator, observation of access requests over a predefined/configurable time frame of a volume of access requests meeting or exceeding a threshold or one or more conditions relating to the spatial information database have been satisfied, then processing continues with block 810; otherwise processing branches to block 808, where additional spatial information continues to be gathered and stored.

At block 810, the stored spatial information is compressed using a lossless compression technique.

At block 812, a compression ratio of the compressed spatial information with respect to the uncompressed spatial information is computed.

At decision block 814, it is determined whether the compression ratio is greater than the defined baseline/threshold value. If so, then processing continues with block 818; otherwise processing branches to block 816.

At block 818, the source IP is identified as being malicious.

At block 816, the source IP is identified as being legitimate.

Figure 9:
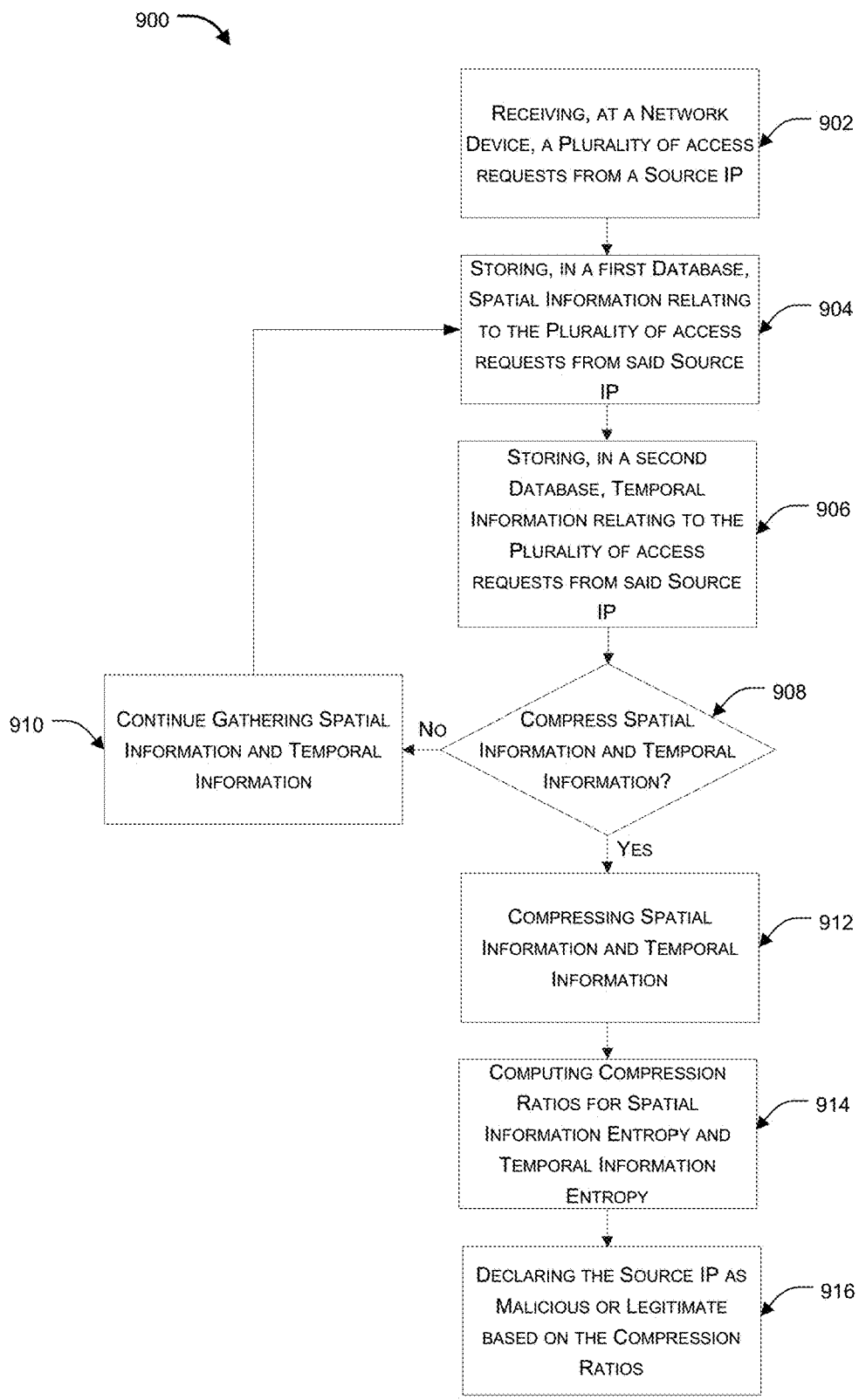
FIG. 9 is a flow diagram illustrating exemplary DDoS detection and response processing in accordance with yet another embodiment of the present disclosure.

FIG. 9 is a flow diagram illustrating exemplary DDoS detection and response processing in accordance with yet another embodiment of the present disclosure. At block 902, a network device can receive multiple access requests originating from a given source IP, wherein, at block 904, the network device can process the access requests to store in a first database, temporal information relating to the access requests.

At block 906, the network device can process the access requests to store in a second database, spacial information relating to the access requests.

At decision block 908, the network device determines whether to perform compression on the stored temporal and spacial information. According to one embodiment, when a compression triggering event has occurred, e.g., expiration of an interval timer, receipt of a command from the administrator, observation of access requests over a predefined/configurable time frame of a volume of access requests meeting or exceeding a threshold or one or more conditions relating to the temporal or spacial database have been satisfied, then processing continues with block 912; otherwise processing branches to block 910, where more temporal and spacial information continues to be gathered and stored.

At block 912, the stored temporal and spacial information are separately compressed using a lossless compression technique.

At block 914, compression ratios of the compressed temporal information with respect to the uncompressed temporal information and of the compressed spacial information with respect to the uncompressed spacial information are computed.

At block 916, when one or both of the compression ratios are greater than their respective defined baseline/threshold values, then the source IP is identified as being malicious; otherwise, the source IP is identified as being legitimate. According to one embodiment, threshold values for both the compression ratios can be different. According to another embodiment, weights can be associated with either or both of the compression ratios. For example, the temporal compression ratio can have a weight of 0.7 and the spatial compression ratio can have the weight of 0.3 such that magnitude by which the compression ratios are greater than respective thresholds can be used as another parameter to determine whether the source IP is malicious.

Figure 10:
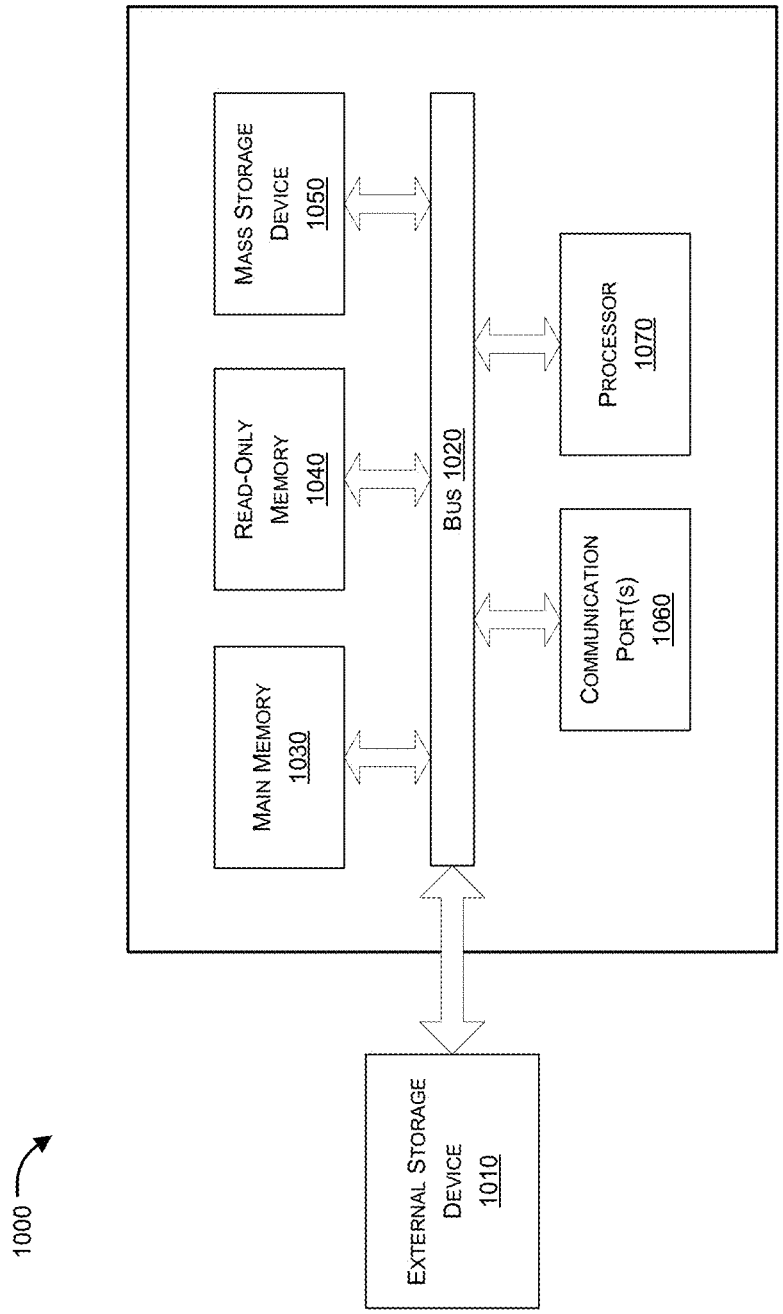
FIG. 10 is an exemplary computer system in which or with which embodiments of the present invention may be utilized.

FIG. 10 is an example of a computer system 1000 with which embodiments of the present disclosure may be utilized. Computer system 1000 may represent or form a part of a network device (e.g., a router, a gateway, a hub, a switch, a firewall, an access point, among other applicable devices) or a server implementing one or more parts of a DDoS attack detection system (e.g., DDoS attack detection system 208) or a DDoS attack detection and response system (e.g., DDoS attack detection and response system 302).

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with monitoring unit as described in FIGS. 2-4. Communication port 1010 can be any of an RS-232 port for use with a modem based dialup connection, a 10/100 Ethernet port, a Gigabit or 10 Gigabit port using copper or fiber, a serial port, a parallel port, or other existing or future ports. Communication port 1010 may be chosen depending on a network, such a Local Area Network (LAN), Wide Area Network (WAN), a WLAN or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method for detecting a distributed denial-of-service (DDoS) attack, the method comprising:
    receiving, at a network device, a plurality of access requests from a source Internet Protocol (IP) address;
    storing, in a first database operatively coupled with the network device, temporal information relating to the plurality of access requests from the source IP address;
    determining, by the network device, based on a first defined condition, whether compression is to be performed on the stored temporal information;
    compressing the stored temporal information, by the network device, when a result of said determining is affirmative;
    computing, by the network device, a compression ratio of the compressed temporal information with respect to the stored temporal information in uncompressed form; and
    identifying, by the network device, the source IP address as malicious when the compression ratio is greater than a defined baseline value.

2. The method of claim 1, wherein said compressing the stored temporal information comprises conducting loss-less compression on the stored temporal information.

3. The method of claim 1, wherein the plurality of access requests represent access requests associated with a protocol including one or more of Session Initiation Protocol (SIP), Hypertext Transport Protocol (HTTP), HTTP Secure (HTTPS), Simple Mail Transfer Protocol (SMTP), Real-time Transport Protocol (RTP), RPT Control Protocol (RTCP), Session Description Protocol (SDP) and Domain Name System (DNS) protocol.

4. The method of claim 1, wherein the defined condition is based on one or a combination of whether the first database has reached a pre-defined size, and whether a defined time interval has elapsed since storage of the temporal information.

5. The method of claim 1, wherein the temporal information includes information regarding one or a combination of a time since a last request of the plurality of access requests was received by or initiated by the source IP address, and a time associated with each of the plurality of access requests from the source IP address.

6. The method of claim 1, further comprising continuing to store the temporal information in the first database when the result of said determining is negative.

7. The method of claim 1, wherein the defined baseline value is determined based on a statistical analysis of one or a combination of a reference compression ratio, a learning engine defined compression ratio, and a desired information entropy.

8. The method of claim 1, further comprising:
storing, in a second database operatively coupled with the network device, spatial information relating to the plurality of access requests from the source IP address;
determining, by the network device, based on a second defined condition, whether compression is to be performed on the stored spatial information;
compressing, by the network device, the stored spatial information when a result of said determining based on a second defined condition is affirmative;
computing, by the network device, a second compression ratio of the compressed spatial information with respect to the stored spatial information in uncompressed form; and
identifying, by the network device, the source IP address as malicious when the second compression ratio is greater than a second defined baseline value.

9. The method of claim 8, wherein the spatial information comprises one or a combination of details regarding the source IP address, details regarding resources requested by the plurality of access requests and details regarding the plurality of access requests.

10. The method of claim 1, wherein the second defined baseline value is based on statistical analysis of one or a combination of a reference compression ratio, learning engine defined compression ratio, and desired information entropy.

11. A method for detecting a distributed denial-of-service (DDoS) attack, the method comprising:
receiving, by a network device, a plurality of access requests from a source Internet Protocol (IP) address;
storing, in a first database operatively coupled with the network device, spatial information relating to the plurality of access requests from the source IP address;
storing, in a second database operatively coupled with the network device, temporal information relating to the plurality of access requests from the source IP address;
determining, by the network device, based on a defined condition, whether compression is to be performed on the stored spatial information and the stored temporal information;
compressing, by the network device, the stored spatial information and the stored temporal information when a result of said determining is affirmative;
computing, by the network device, a first compression ratio for entropy associated with the stored spatial information and a second compression ratio for entropy associated with the stored temporal information; and
identifying, by the network device, the source IP address as malicious based on the first compression ratio and the second compression ratio.

12. The method of claim 11, wherein said compressing the stored spatial information and the stored temporal information comprises applying a lossless compression to the stored spatial information and to the stored temporal information.

13. The method of claim 11, wherein the plurality of access requests represent access requests associated with a protocol including one or more of Session Initiation Protocol (SIP), Hypertext Transport Protocol (HTTP), HTTP Secure (HTTPS), Simple Mail Transfer Protocol (SMTP), Real-time Transport Protocol (RTP), RPT Control Protocol (RTCP), Session Description Protocol (SDP) and Domain Name System (DNS) protocol.

14. The method of claim 11, wherein the temporal information includes information regarding one or a combination of a time since a last request of the plurality of access requests was received by or initiated by the source IP address, and a time associated with each of the plurality of access requests from the source IP address.

15. The method of claim 11, further comprising when the result of said determining is negative:
continuing to store the spatial information in the first database; and
continuing to store the temporal information in the second database.

16. The method of claim 11, wherein the spatial information comprises one or a combination of details regarding the source IP address, details regarding resources requested by the plurality of access requests and details regarding the plurality of access requests.

17. A system for detecting a distributed denial-of-service (DDoS) attack, the system comprising:
a non-transitory storage device having embodied therein instructions representing one or more modules; and
one or more processors coupled to the non-transitory storage device and operable to execute the one or more modules, wherein the modules include:
a data receiving module, which when executed by the one or more processors receives a plurality of access requests from a source Internet Protocol (IP) address;
a temporal data storage module, which when executed by the one or more processors stores temporal information relating to the plurality of access requests in a first database;
a spatial data storage module, which when executed by the one or more processors stores spatial information relating to the plurality of access requests in a second database operatively coupled with the network device;
a compression module, which when executed by the one or more processors compresses the stored temporal information and computes a first compression ratio of the compressed temporal information with respect to the stored temporal information in uncompressed form, wherein the compression module further compresses the stored spatial information and computes a second compression ratio of the compressed spatial information with respect to the stored spatial information in uncompressed form; and
a compression ratio based decision module, which when executed by the one or more processors identifies the source IP address as malicious based on a comparison of the first compression ratio with a first defined baseline value, and a comparison of the second compression ratio with a second defined baseline value.

18. The system of claim 17, wherein compression one or both of the stored temporal information and the stored spatial information is performed through loss-less compression.

19. The system of claim 17, wherein the temporal information includes information regarding one or a combination of a time since a last request of the plurality of access requests was received by or initiated by the source IP address, and a time associated with each of the plurality of access requests from the source IP address.

20. The system of claim 17, wherein the first defined baseline value is determined based on a statistical analysis of one or a combination of a reference compression ratio, a learning engine defined compression ratio, and a desired information entropy.

21. The system of claim 17, wherein the second defined baseline value is determined based on a statistical analysis of one or a combination of a reference compression ratio, a learning engine defined compression ratio, and a desired information entropy.

22. The system of claim 17, wherein the spatial information comprises one or a combination of details regarding the source IP address, details regarding resources requested by the plurality of access requests and details regarding the plurality of access requests.

* * * * *